(12) United States Patent
Cheng

(10) Patent No.: US 7,414,846 B2
(45) Date of Patent: Aug. 19, 2008

(54) COOLING STRUCTURE FOR INTERFACE CARD

(75) Inventor: Chia-Chun Cheng, Chung-Ho (TW)

(73) Assignee: Cooler Master Co., Ltd., Taipei Hsien (TW)

( * ) Notice: Subject to any disclaimer, the term of this patent is extended or adjusted under 35 U.S.C. 154(b) by 0 days.

(21) Appl. No.: 11/748,561

(22) Filed: May 15, 2007

(65) Prior Publication Data

US 2007/0285899 A1    Dec. 13, 2007

(30) Foreign Application Priority Data

Jun. 9, 2006    (TW) .............................. 95210094 U

(51) Int. Cl.
  *H05K 7/20* (2006.01)
  *H01L 23/467* (2006.01)
(52) U.S. Cl. ................. 361/699; 361/687; 361/698; 361/714; 361/719; 165/80.3; 165/80.4; 165/80.5; 165/104.33; 62/259.2
(58) Field of Classification Search ......... 361/687–695, 361/698, 699, 700–702, 704, 712–714, 717–724; 165/80.3, 80.4, 80.5, 104.19–104.21, 104.33, 165/104.34, 121–126, 185; 62/259.2; 174/15.1, 174/16.1, 15.2, 16.3, 252; 257/713–715, 257/722–726
See application file for complete search history.

(56) References Cited

U.S. PATENT DOCUMENTS

| 6,438,984 B1 * | 8/2002 | Novotny et al. ............ 62/259.2 |
| 6,452,797 B1 * | 9/2002 | Konstad ....................... 361/695 |
| 6,567,269 B2 * | 5/2003 | Homer et al. ................ 361/700 |
| 6,587,343 B2 * | 7/2003 | Novotny et al. ............. 361/698 |
| 6,671,177 B1 * | 12/2003 | Han ............................ 361/719 |
| 6,717,811 B2 * | 4/2004 | Lo et al. ...................... 361/698 |
| 6,795,315 B1 * | 9/2004 | Wu et al. ..................... 361/695 |
| 7,002,797 B1 * | 2/2006 | Wittig ......................... 361/695 |
| 7,151,667 B2 * | 12/2006 | Walters et al. ............... 361/699 |
| 7,254,025 B2 * | 8/2007 | Baldwin, Jr. ................. 361/700 |
| 7,277,280 B2 * | 10/2007 | Peng .......................... 361/695 |
| 7,339,792 B2 * | 3/2008 | Han ............................ 361/719 |
| 7,365,989 B2 * | 4/2008 | Peng et al. ................... 361/720 |
| 2005/0061477 A1 * | 3/2005 | Mira .......................... 165/80.3 |
| 2007/0125522 A1 * | 6/2007 | Stefanoski ............. 165/104.21 |

* cited by examiner

*Primary Examiner*—Michael V Datskovskiy

(57) ABSTRACT

A cooling structure for interface card for cooling the heating component on an interface card includes a heat sink, a metallic hood, and a water block, wherein the heat sink has a heat conducting seat and a plurality of cooling fins, while the heat conducting seat is attached to the heating component of the interface card. Furthermore, the metallic hood arranged on the heat sink is connected thereto. Finally, the water block is arranged on the metallic hood; thereby, the operational heat, generated from the heating element, is absorbed by the heat-conducting seat and is then conducted to the fins of the heat sink, so that the operational heat is distributed to the metallic hood by heat conducting process, making the operational heat that is generated by the heating component carried away through the heat exchanging function of the water block, and thus a desired cooling effectiveness is achieved.

11 Claims, 7 Drawing Sheets

COOLING STRUCTURE FOR INTERFACE CARD

BACKGROUND OF THE INVENTION

1. Field of the Invention

The present invention generally relates to a cooling device, in particular, to a cooling structure arranged on an interface card.

2. Description of Prior Art

Nowadays, the development of modern personal computer is advancing with each passing day. Personal computer user not only asks for high processing speed, but also pays much attention to high stability. Since of the significant progress of IC technology, a chip originally containing only tens of transistors has developed into a chip currently containing over ten millions of transistors, following the breakthrough of the micro- and nano-technology. Although the progress on technology has the advantages to notably lower down the price of personal computer and, in large scale, enhance the function of electronic component, the cooling ability is, however, often frequently unable to keep up with the development of manufacturing process, due to the lack of package technique of electronic component.

On the other hand, the enhancement of processing speed of personal computer is often dependent upon the functional combination of interface cards to thereby develop the effectiveness thereof. Taking the graphic display card for example, in order to satisfy the requirement of consumer, manufacturers successively introduce innovative products with faster processing speed, so that the working time pulse of the chip on an innovative graphic display card is frequently over thousand millions hertz (Hz) while, under such high frequency working speed, all circuit dispositions are packaged within an IC chip with a size of only 1.2 cm$^2$, which will occur overheating problem derived from the continuous collisions among electrons.

Therefore, if the high heat generated from the graphic display card can not be removed through the cooling structure designed effectively then, not only the consuming power will be increased, but also the electronic element will be damaged to therefore shrink the life thereof, seriously influencing the effectiveness, reliability and stability of a processor. Therefore, how to get rid of the heat arisen from the chip on the interface card so effectively to ensure a normal operation of personal computer has become a most noted problem for both the manufactures and the users of the interface card.

Currently, there are two kinds of methods commonly used for removing the heat generated from the interface cards in a personal computer; namely, one is air-cooling heat sink, and the other is water-cooling heat sink. In an air-cooling heat sink, fin and fan are two major constituting components. The heat sink, comprised of a plurality of fins made of metallic material, will significantly increase the cooling area to dissipate the heat accumulated therein, and large amount of heat is further carried away by the forced convection produced by fan, whereby an efficient cooling will be effected upon the chip of the interface card. Such heat sink is not only structured simply, but also able to fulfill a satisfactory effectiveness.

However, for such air-cooling heat sink, when each time one design has been created, most manufacturers have to make a prototype, and an efficiency test is then undergone accordingly. Therefore, the temperature reduced by such air-cooling heat sink is quite limited, because large amount of heat still can not be carried away quickly.

On the other hand, a water-cooling heat sink commonly takes a shell-tube heat exchanger as a mainly designing body. As shown in FIG. 1, a water block 10a carries away the heat generated in heat source by making heat exchange therewith, wherein water having high heat capacity is employed. However, if the water block 10a connected onto the interface card 20a is poorly design, it may incur a misgiving that an accident water leakage may damage the electronic component 201a disposed upon the interface card 20a. Since a container 12 has to be arranged in the mainframe for such heat sink for accommodating water, a pump 14a is further needed. The contour design of this container 12 also requires sufficient cooling ability, such that a material having high heat capacity is provided for this kind of heat dissipation. However, under a long time operation, which in turn creates high temperature circumstance, the cooling ability of this kind of heat sink will still be notably degraded, due to the continuous raise of water temperature.

SUMMARY OF THE INVENTION

Regarding aforementioned drawbacks, the main objective of the present invention is to provide a cooling structure for interface card, which comprises two cooling modes: the air-cooling mode and the water-cooling mode, and which may enhance the cooling efficiency for the interface card through a double cooling mechanisms: the heat sink and the water block.

To achieve above objectives, the present invention provides a cooling structure for an interface card to cool a heating component on an interface card, mainly including a heat sink, a metallic hood, and a water block, wherein the heat sink has a heat conducting seat and a plurality of cooling fins, and the heat-conducting seat is attached onto the heating component of the interface card; furthermore, the metallic hood arranged on the heat sink is connected thereto; finally, the water block is arranged on the metallic hood; thereby, the operational heat, generated from the heating element, is absorbed by the heat-conducting seat and is then conducted to the fins of the heat sink, so that the operational heat is distributed cross the metallic hood by heat conducting process, making the operational heat that is generated by the heating component carried away through the heat exchanging function of the water cooling head, and thus a desired cooling effectiveness is achieved.

BRIEF DESCRIPTION OF DRAWING

The features of the invention believed to be novel are set forth with particularity in the appended claims. The invention itself, however, may be best understood by reference to the following detailed description of the invention, which describes several exemplary embodiments of the invention, taken in conjunction with the accompanying drawings, in which:

DETAILED DESCRIPTION OF THE INVENTION

In cooperation with attached drawings, the technical contents and detailed description of the present invention will be as follows.

Figure 1:
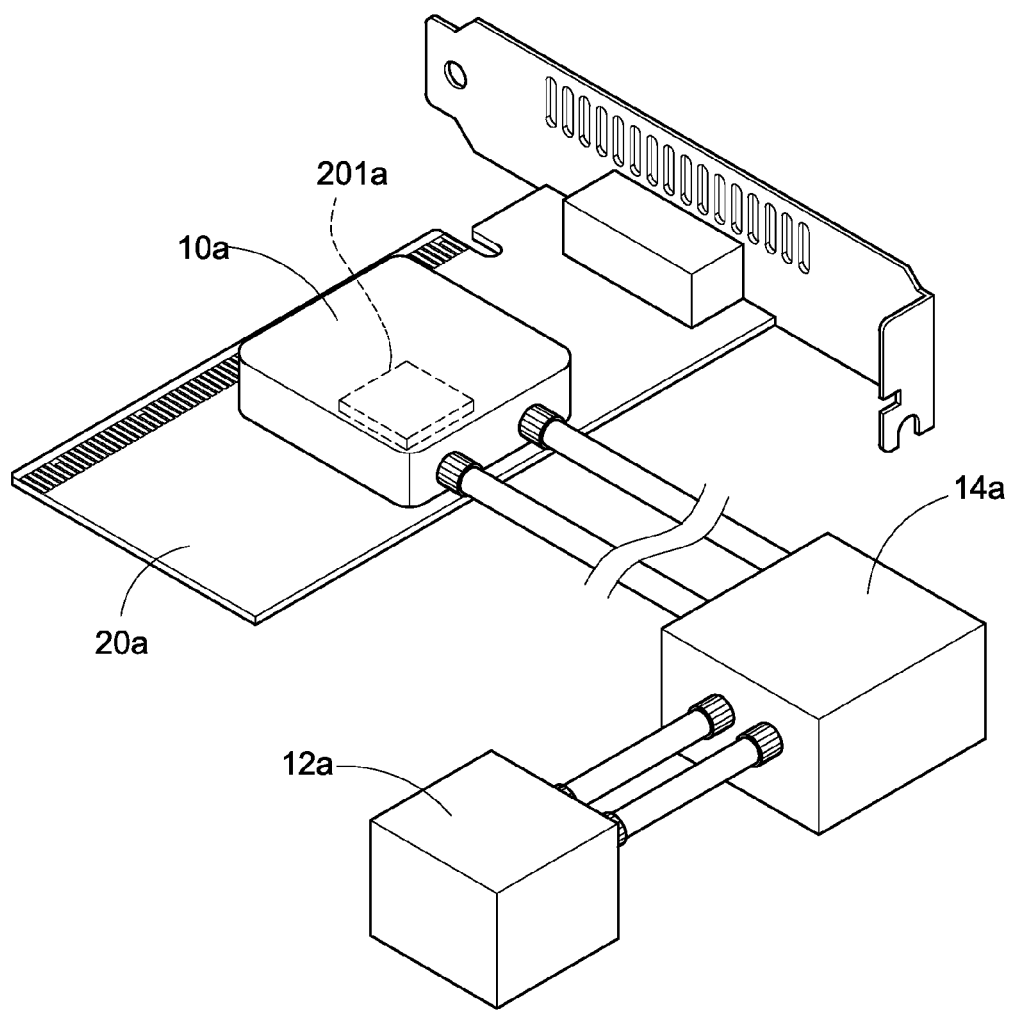
FIG. 1 is a perspective structural view showing a water-cooling device according to the prior arts.
Figure 2:
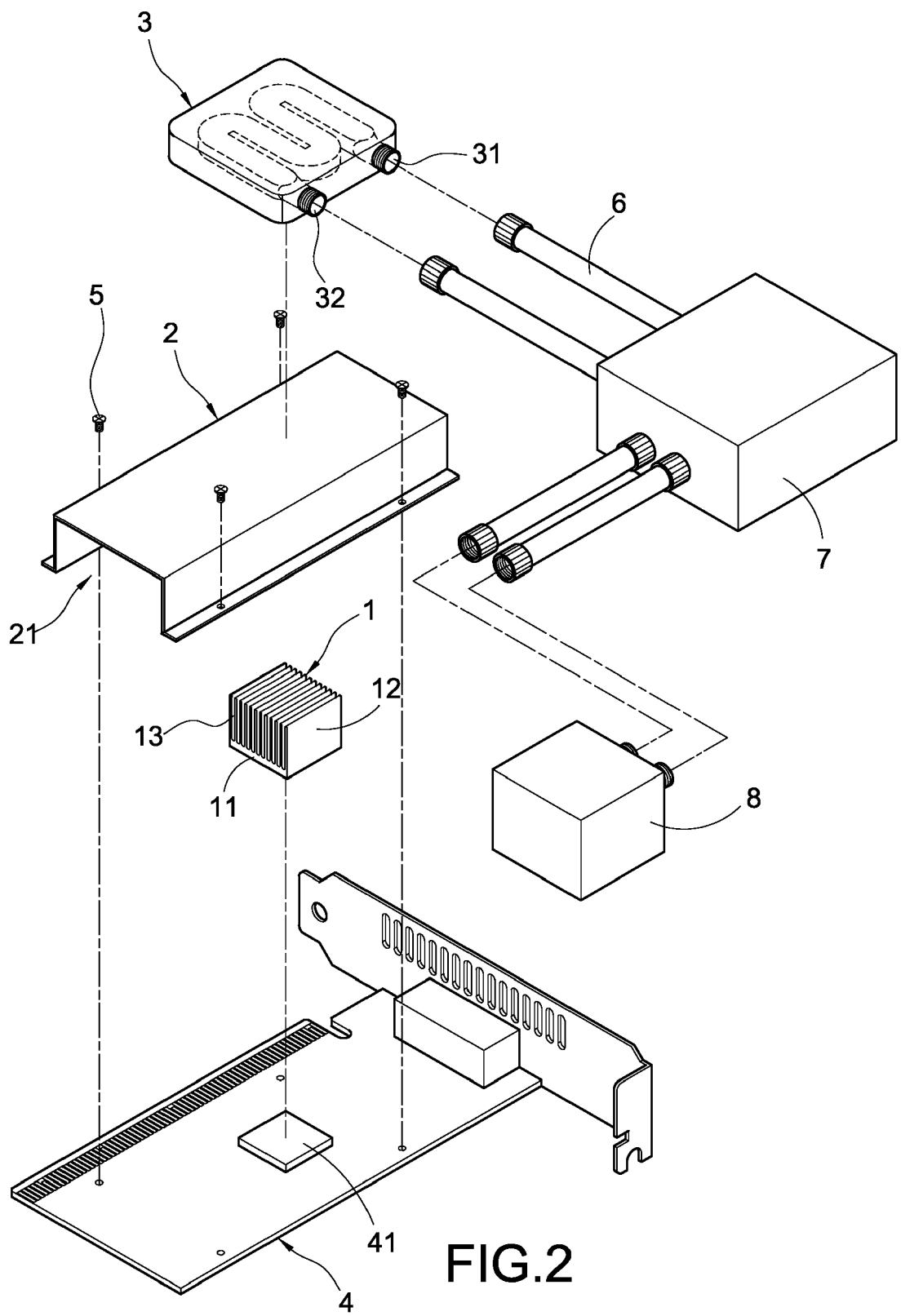
FIG. 2 is an explosive illustration showing the perspective structure according to the present invention.
Figure 3:
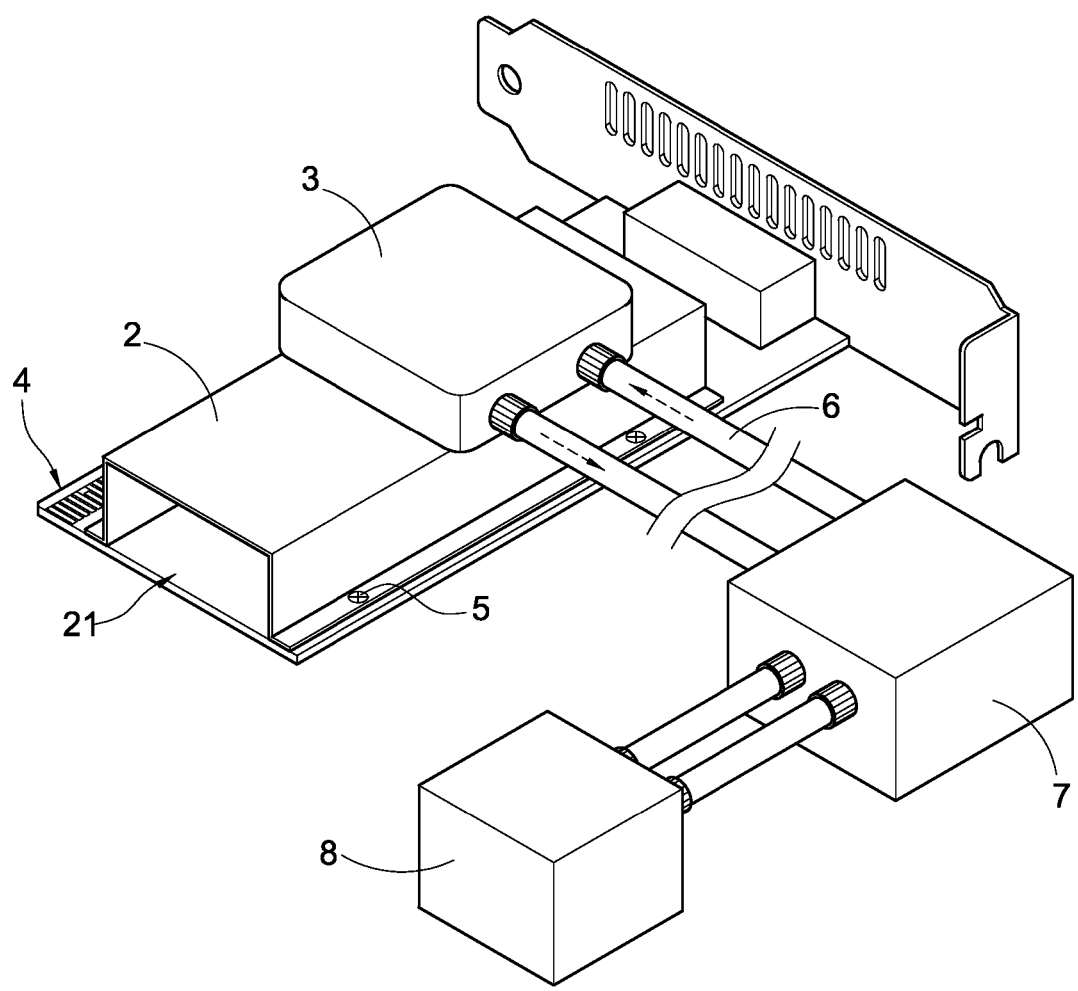
FIG. 3 is a perspective assembling view according to the present invention.
Figure 7:
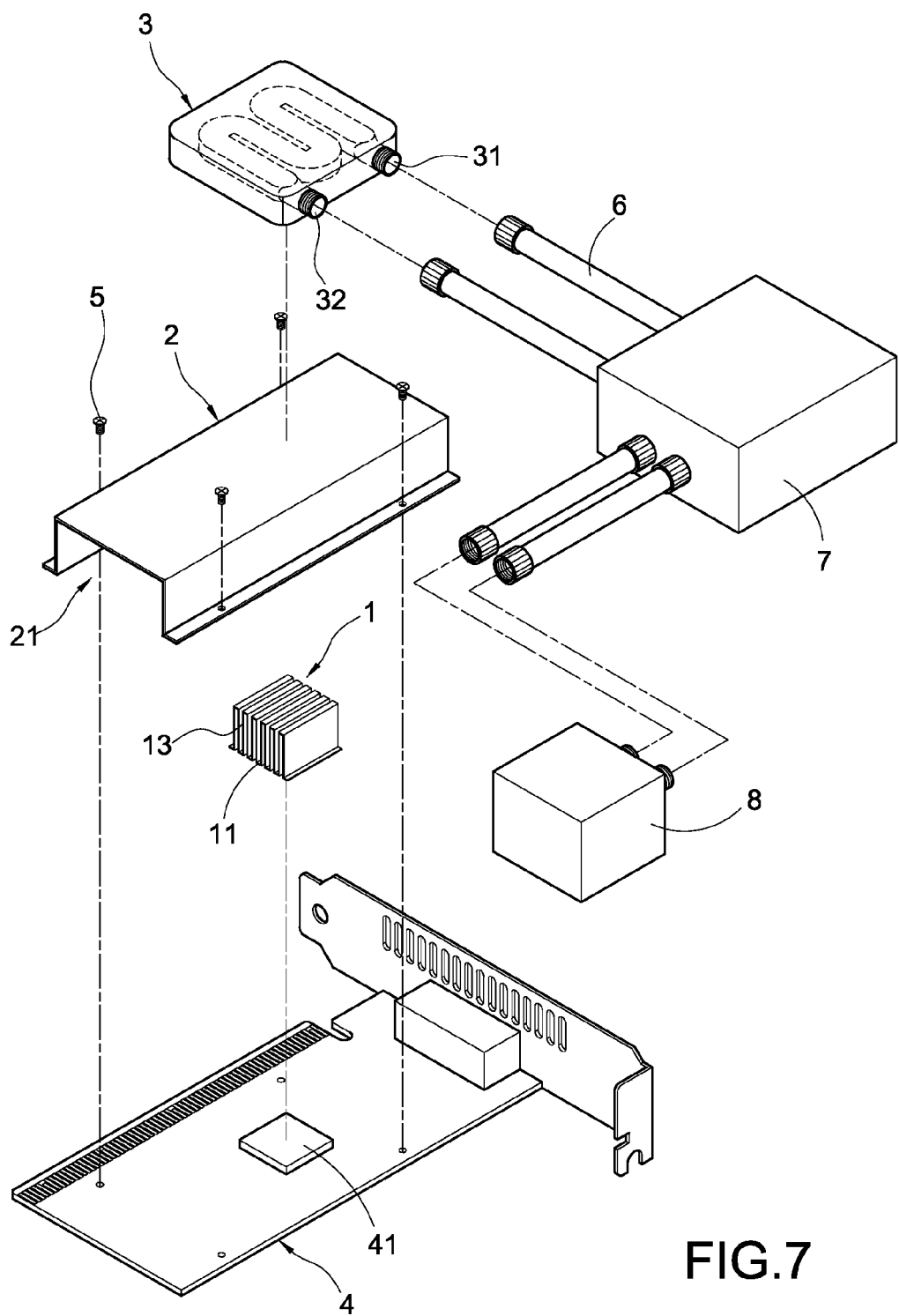
FIG. 7 is a structural illustration showing another embodiment of the heat sink according to the present invention.

Please refer to FIG. 2 and FIG. 3, which respectively are perspective structural explosive illustration and perspective assembling view according to the present invention, main structure of which is comprised of a heat sink 1, a metallic hood 2, and a water block 3. Wherein, the heat sink 1 has a heat conducting seat 11 and a plurality of cooling fins 12 formed on the heat conducting seat 11. In the meantime, a cooling flow path is formed between any two adjacent cooling fins 12. The heat sink 1 is arranged on a heating component 41 of an interface card 4, and the heat conducting seat 11 is directly attached onto the heating component 41. In this case, the appearance of the metallic hood 2 is formed as a reverse-U shape and an opening 21 is respectively arranged at two sides thereof. The hood 2 is arranged over the interface card 4 and is connected thereto by means of screwing elements 5. The heat sink 1 is totally enclosed within the metallic hood 2 and its plural cooling fins 12 are directly contacted with the metallic hood 2. At last, the water block 3 is directly attached onto the outer surface of the metallic hood 2. In the water block 3, corresponding to the position of the heat sink 1, there are flow paths provided for coolant to pass through, which belongs to the prior arts, being not described repetitiously thereinafter. The water block 3 has a water inlet 31 and a water outlet 32 and is connected to a pump 7 and an accommodating tank 8 via a plurality of conduits 6, all of which belong to the prior arts, being not described herein repetitiously. In addition, besides aforementioned structures, the heat sink 1 may also be an extrusion-molded heat sink 1, as shown in FIG. 7.

Figure 4:
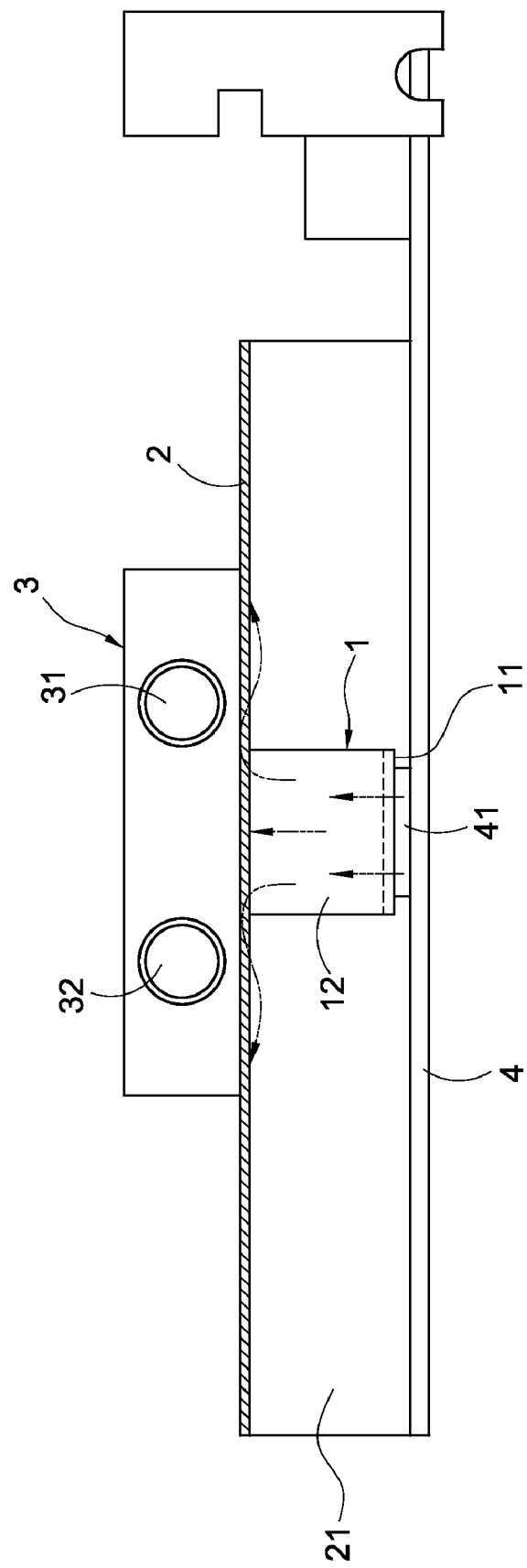
FIG. 4 is a sectional view illustrating the operation according to the present invention.

Please refer to FIG. 4, which is a sectional view illustrating the operation according to the present invention. The operating heat, which is generated from the operation of the heating component 41 on the interface card 4, is directly absorbed by the heat conducting seat 11 attached on the heating component 41, then being conducted upwardly along the plural cooling fins 12 of the heat conducting seat 11 (directions of which are same as those of arrows shown in the figure), making a heat exchange with the air passing through the metallic hood 2 for undergoing a heat-dissipating operation. Furthermore, the operating heat, conducted from the heat conducting seat 11 to the plural cooling fins 12, is further conducted upwardly onto the metallic hood 2 connected with the plural cooling fins 12, and is again distributed cross the hood body of the metallic hood 2 uniformly. In addition to the air-cooling operation proceeded directly between the metallic hood 2 and the ambient air, the operating heat, absorbed by the water block 3 attached with the metallic hood 2, may also undergoes heat exchange with the coolant flowing in the water block 3, and thus the cooling operation of the interface card may be enhanced.

Figure 5:
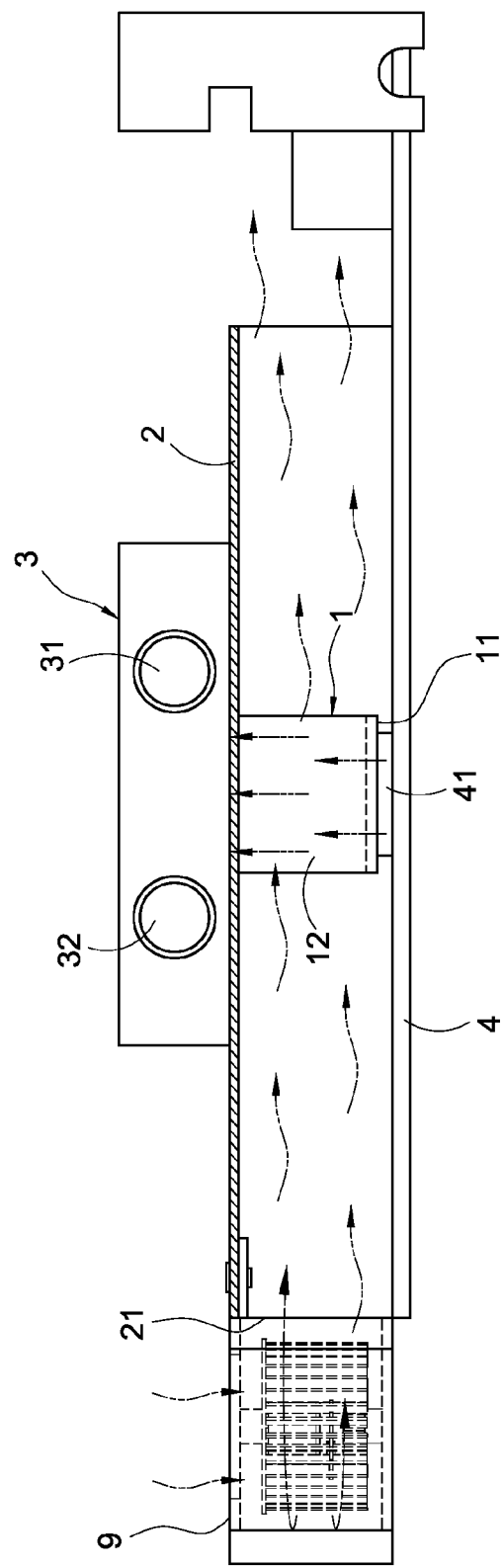
FIG. 5 is a structural sectional view showing another embodiment according to the present invention.

Please refer to FIG. 5, showing a structural sectional view of another embodiment according to the present invention. The air flowing direction of the fan 9 arranged at the opening 21 at one side of the metallic fan 2 is parallel to the cooling flow path 13. The operating heat, which is generated from the heating component 41 and is then absorbed by the plural cooling fins 12 of the heat sink 1, after being heat exchanged with ambient air, through the forced air flow generated by the fan 9, directly exits through another opening 21 of the metallic hood 2, (the air flowing directions are same as those of the arrows shown in the figure), and thus the heat dissipation of air-cooling type is accelerated.

Figure 6:
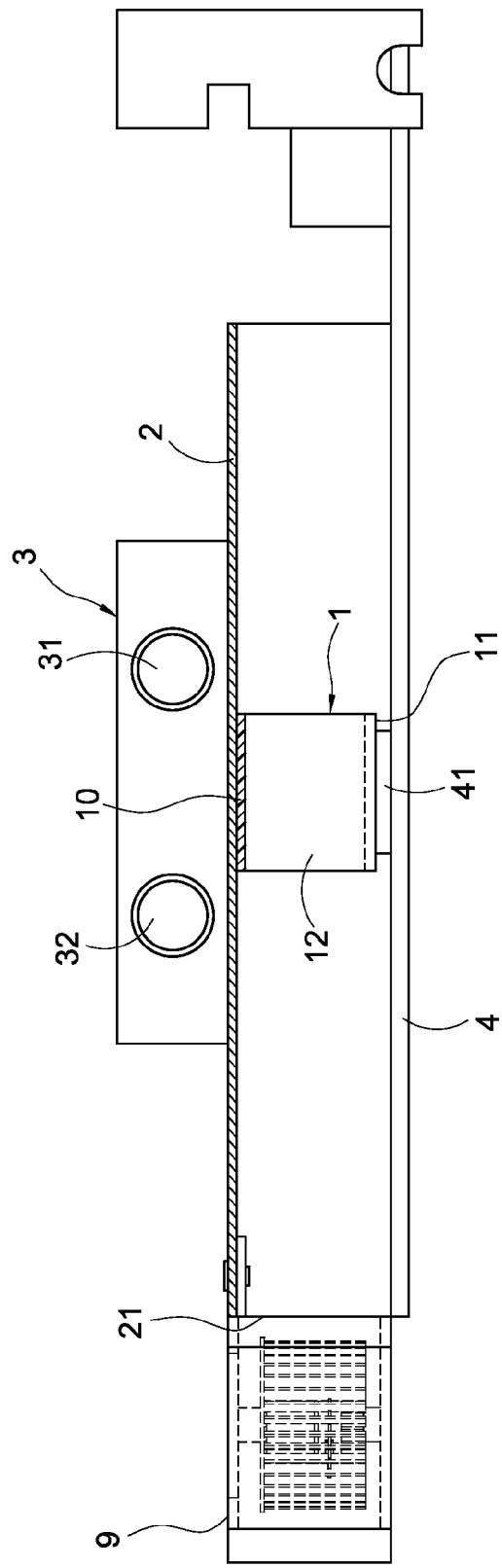
FIG. 6 is a structural sectional view showing further embodiment according to the present invention.

However, in the connecting structure of aforementioned metallic hood 2 and heat sink 1, a heat conducting medium 10 with high thermal conductivity may also be coated between the metallic hood 2 and the plural cooling fins 12 of the heat sink 1, as shown in the sectional view of FIG. 6, such as thermal conductive adhesive or solder paste for example, whereby the heat conducting operation between the heat sink 1 and the metallic hood 2 is notably promoted.

Aforementioned description is only preferable embodiments according to the present invention, being not used to limit its executing scope. Any equivalent variation and modification made according to appended claims is all covered by the claims claimed by the present invention.

What is claimed is:

1. A cooling structure for interface card, for reducing the high temperature generated by a heating component of a interface card, comprising:
    a heat sink, having a heat conducting seat and a plurality of cooling fins formed thereon, the heat conducting seat being attached onto the heating component;
    a metallic hood, arranged over the interface card, enclosing the entire heat sink, and inter-attached with the plurality of cooling fins of the heat sink; and
    a water block, attached to outside of the metallic hood, and having a water inlet and a water outlet, for provision of coolant flowing in and flowing out the water block.

2. The cooling structure for interface card according to claim 1, wherein the heat sink is an aluminum extrusion-molded heat sink.

3. The cooling structure for interface card according to claim 1, wherein a cooling flow path is formed between any two adjacent cooling fins of the heat sink.

4. The cooling structure for interface card according to claim 1, wherein a heat conducting medium is arranged between the heat sink 1 and the metallic hood.

5. The cooling structure for interface card according to claim 4, wherein the heat conducting medium is a solder paste.

6. The cooling structure for interface card according to claim 4, wherein the heat conducting medium is a thermal conductive paste.

7. The cooling structure for interface card according to claim 1, wherein the metallic hood is formed as a reverse-U shape.

8. The cooling structure for interface card according to claim 1, wherein one opening is arranged at each of two sides of the metallic hood.

9. The cooling structure for interface card according to claim 8, further including a fan, arranged at one opening of the metallic hood.

10. The cooling structure for interface card according to claim 9, wherein an air flowing direction of the fan is parallel to a cooling flow path formed between any two adjacent cooling fins of the heat sink.

11. The cooling structure for interface card according to claim 1, wherein a position of the water block is corresponding to that of the heat sink.

* * * * *